Dec. 19, 1967 L. LERICH ET AL 3,358,549
ROCK BOLT
Filed Feb. 21, 1966
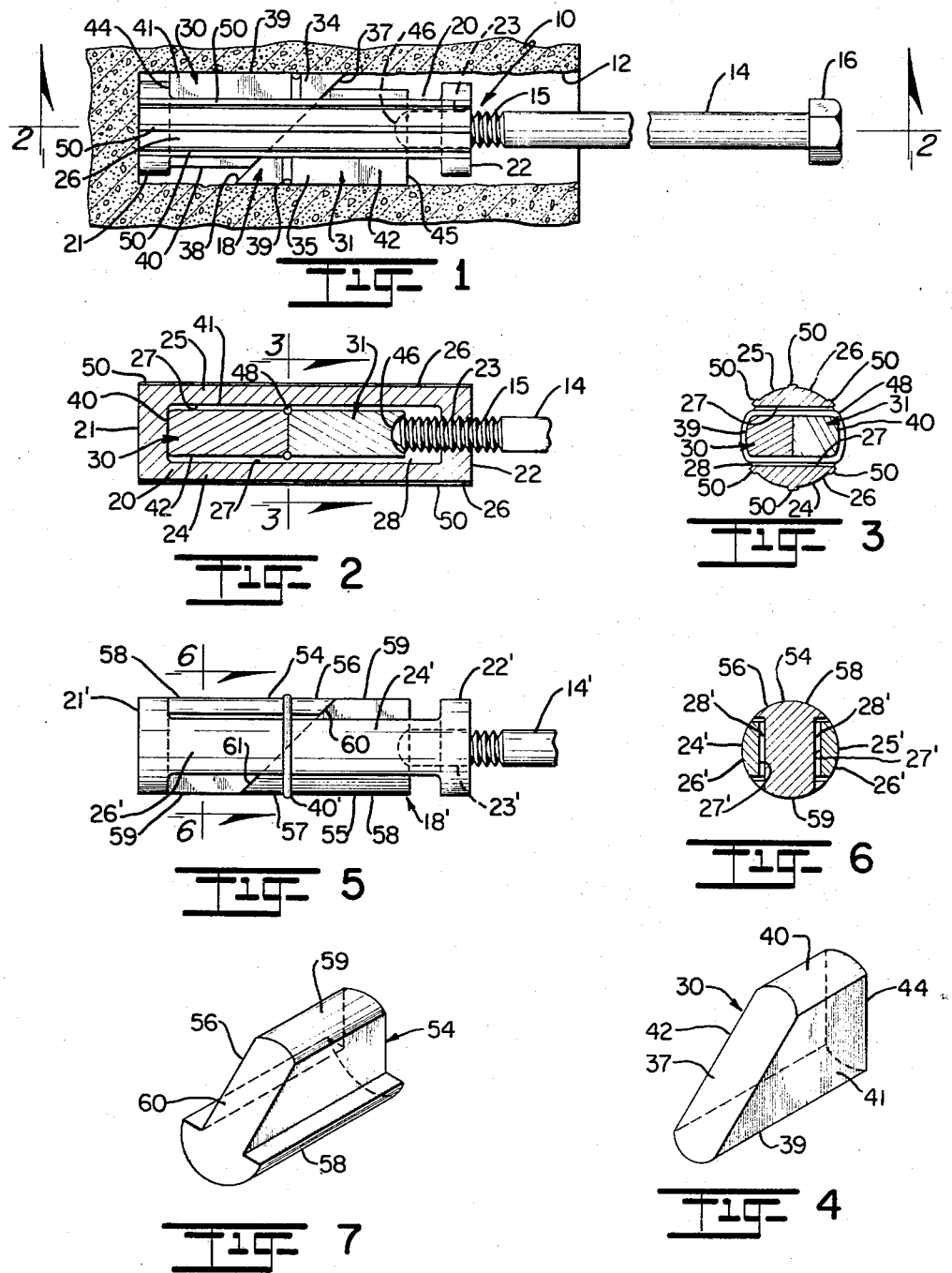
INVENTOR.
LESTER LERICH
DANIEL P. ROESLER
BY
John E. Reilly
ATTORNEY

United States Patent Office 3,358,549
Patented Dec. 19, 1967

3,358,549
ROCK BOLT
Lester Lerich, Lakewood, Colo., and Daniel P. Roesler, Rapid City, S. Dak., assignors to Wej-It Expansion Products, Inc., Broomfield, Colo., a corporation of Delaware
Filed Feb. 21, 1966, Ser. No. 529,104
8 Claims. (Cl. 85—66)

ABSTRACT OF THE DISCLOSURE

An anchor bolt is formed of a hollow cylindrical shell which serves as a housing for a pair of complementary wedge members in the form of generally rectangular blocks disposed in end-to-end relation within an open space formed within the shell and having complementary inclined end surfaces disposed in abutting relation to one another. A bolt member has an inner threaded end which when passed through one end of the shell into engagement with the end of one of the wedge members will upon inward axial threaded advancement cause the wedge members to advance radially in opposite directions into firm wedging engagement with opposite sides of the hole.

---

This invention relates to novel and improved anchor bolts and more particularly relates to a rock bolt adaptable for use in anchoring a member to rock, concrete, masonry and other like materials and which is characterized by having improved anchor means being selectively movable under the control of a bolt member into firm wedging engagement with the wall of an opening.

A principal and foremost object of the present invention is to provide a highly effective and reliable anchoring means having particular utility in establishing positive anchored engagement within a blind hole drilled either in hard or soft rock materials, such as, for instance to serve as effective anchoring means in mine roof bolt applications; and further wherein the anchoring means is conformable for use in cooperation with different lengths and sizes of bolt members to undergo selective outward expansion into anchored relation within a blind hole in response to rotation or tightening of the bolt member.

It is another object of the present invention to provide a rock bolt incorporating novel and improved wedging elements which by virtue of their construction and relative disposition at the inner threaded end of a bolt member are capable of being positively and directly forced outwardly under the control of the bolt member into firm wedging engagement with the surrounding wall of an opening and are further capable of undergoing a wide degree of circumferential expansion and of establishing positive gripping engagement with hard rock or metallic materials without breaking, cracking or loosening under extreme loading or stresses.

It is a further object of the present invention to provide a novel and improved expansion means for an anchor bolt wherein such means are connectable to an inner threaded end of a bolt member and are provided with complementary wedging elements so constructed and arranged as to be movable outwardly by manipulation from the external end of the bolt member into positive anchored relation within a bolt hole, the expansion means being further characterized by being rugged and durable in construction, economical to fabricate and assemble, as well as being highly simplified, reliable and effective in use.

In accordance with the present invention, there is provided a rock bolt having an anchor member which has an outer retainer connectable to the inner threaded end of a bolt member, and wedging elements are loosely disposed within the retainer and are slidable in an outward radial direction under inward tightening of the bolt member into wedging engagement with the wall of a blind hole. The wedging elements are of rugged, solid construction with complementary wedging surface portions which will expand outwardly in opposite directions into positive wedging engagement with a wall and in such a way as to firmly anchor the entire assembly against displacement in either direction. Further the anchor member is so constructed as to be useable with different sizes and lengths of bolts, according to the depth and size of the hole, and will maintain proper alignment of the wedging elements for expansion once inserted in the hole; and further the retainer will remain securely fixed against rotation as the bolt member is rotated or tightened from its external end to expand the wedging elements outwardly into anchored relation. Preferably the wedging elements are in the form of oblong, solid blocks and are especially suited for use in hard rock, concrete and masonry materials.

The above and other objects, advantages and features of the present invention will become more readily understood and appreciated from a consideration of the following detailed description when taken together with the accompanying drawings, in which:

FIGURE 1 is an elevational view of a preferred form of rock bolt assembly illustrated in anchored relation within a hole.

FIGURE 2 is a sectional view of the anchor member in assembled relation to the inner threaded end of a bolt member as shown in FIGURE 1.

FIGURE 3 is a sectional view taken on line 3—3 of FIGURE 2.

FIGURE 4 is a perspective view of a wedging element employed in the preferred form of invention.

FIGURE 5 is an elevational view of a modified form of rock bolt assembly in accordance with the present invention.

FIGURE 6 is a sectional view taken on line 6—6 of FIGURE 5; and

FIGURE 7 is a perspective view of the wedging element employed in the alternate form of invention shown in FIGURES 5 and 6.

Referring in more detail to the drawings, there is illustrated in FIGURES 1 to 4 a preferred form of rock bolt assembly 10 being adapted for insertion in a bore hole 12 drilled into a hard, solid material, such as, concrete, masonry or rock material. Here the bolt assembly 10 consists of a bolt member having an elongated cylindrical shank 14 threaded at inner end 15 and including an enlarged head 16 at its outer external end portion. An anchor member 18 is threadedly connectable to the inner end of the bolt shank 14 and is provided with an outer elongated, hollow cylindrical retainer or shell 20 having inner and outer spaced circular end portions 21 and 22 with a threaded bore 23 centrally located in the outer end 22 to permit insertion and inward projection of the inner threaded end portion 15. The circular ends 21 and 22 are interconnected by spaced sidewall connecting portions 24 and 25, each having an external curved surface 26 formed on a radius corresponding to that of the circular ends and an inner flat surface portion 27. As best seen from FIGURE 3, the connecting portions 24 and 25 define limited chordal portions of the shell and are diametrically opposed with the inner flat surfaces arranged in spaced parallel relation to one another to define an open rectangular space or channel 28 extending the entire length of the shell between the circular ends 21 and 22.

An important feature of the present invention resides in the disposition and arrangement of a pair of wedging block elements 30 and 31 within the space 28 and in such a way as to be movable outwardly in diametrically opposed radial directions, under the urging of the bolt shank 14, into positive anchored relation with the wall of the hole. Preferably, each of the inner and outer wedging block elements 30 and 31 is generally rectangular in cross section, being relatively wide and thick as well as being longitudinally tapered to provide wedging sections 34 and 35, respectively, which in assembled end-to-end relation define complementary wedging surface portions 37 and 38. Preferably, the wedging block elements 30 and 31 are dimensioned so that when aligned in end-to-end relation within the shell 20 the block elements will occupy substantially the entire space 28. Moreover, each block is most desirably of a width corresponding to the diameter of the outer shell and includes external curved end surfaces 39 and 40 along opposite, longer and shorter sides, respectively, conforming to the circular configuration of the circular ends 21 and 22; and each of the blocks is of a thickness to occupy the width of the space between the sidewalls 24 and 25 with opposite parallel flat surfaces 41 and 42 disposed adjacent and parallel to the inner flat surfaces 27 of the sidewalls. In assembled relation, the inner or forward block element 30 has an inner squared end surface 44, opposite the wedging surface 37, which rests on the inner surface of the circular end surface 45 spaced inwardly of the inner surface of the circular end 22, and the end surface 45 is provided with a depression 46 which is aligned with the threaded bore 23 for engagement by the inner extremity of the threaded end portion 15.

To assemble the anchor member, the wedging blocks are temporarily retained in aligned relation within the peripheral outline of the shell for insertion into the hole 12 by a band 48 or other suitable means which is placed over the external surface of the shell and the external surfaces of the block elements as illustrated in FIGURES 1 to 3; or if desired the band may be placed in a peripheral groove, not shown, along the external surfaces of the sidewalls 24 and 25 and block elements 30 and 31. Here the band 48 is composed of a material which can be easily ruptured or expanded when the wedging elements are circumferentially expanded in a manner to be described. In addition, the surfaces 26 of the sidewalls are formed with external ridges or lugs 50 in circumferentially spaced relation and which function in a well-known manner to prevent rotation of the shell as the bolt member is rotated to expand the wedge elements, as well as to prevent slipping or breaking of the band 48 in passing inwardly through the hole.

The angular relation between the wedging surfaces 37 and 38 generally may be varied according to its intended application; for example, it has been found that the complementary angle formed between the surface portions should be relatively steep for hard rock materials; but should be comparatively flat for use in soft rock materials. In use, the wedging elements are assembled in end-to-end relation within the space 28 and the retainer band 48 placed thereover, after which the shell is threaded on to the inner end 15 of the bolt member with the inner extremity of the bolt inserted in the depression 46. In this relation, the length and diameter of the bolt assembly should be selected to closely correspond with the depth and size of the hole. Upon insertion to the desired depth, the bolt member 14 may be tightened inwardly by rotation from its external end 16 whereupon the inner threaded end portion 15 will force the outer wedge element 31 inwardly with its wedging surface 38 sliding forwardly along the wedging surface 37 of the inner block element 30; and since the outer surface of the block 31 is engaged by the inner threaded end 15 the block 31 will tend to tilt somewhat about the longitudinal axis of the bolt to force or cam its wedging surface 38 radially and outwardly in a transverse direction from the shell. This tilting action will correspondingly cause outward tilting of the inner block element 30 in an opposite direction so that the tapered ends of the wedging sections are expanded in opposite directions into firm wedging engagement with the wall of the hole. It will also be noted that upon tightening the bolt the shell is retracted or withdrawn in a direction rearwardly through the bore hole until the wedging sections are expanded to the maximum extent against the wall surface and in which relation the wedging sections will firmly grip opposite sides of the wall surface while facing in opposite directions so as to establish a positive anchor in opposite longitudinal directions within the hole.

In a modified form of the present invention, as shown in FIGURES 5 to 7, complementary wedging elements 54 and 55 are provided for insertion in a shell 18′ and wherein the wedging elements are designed to provide enlarged bearing surfaces to establish firm wedging engagement with the wall. To this end, the shell 18′ is again provided with inner and outer circular ends 21′ and 22′ being interconnected by diametrically opposed sidewalls 24′ and 25′. The sidewalls while being of the same general configuration as sidewalls 24 and 25 of the preferred form of invention are reduced in size, as best seen from FIGURE 6, but are similarly provided with external rounded surfaces 26′ and inner, flat parallel surfaces 27′.

The wedging elements 54 and 55 are oblong and are longitudinally tapered as in the preferred form to define angular wedging sections 56 and 57 together with a longer side 58 and shorter side 59. Here the longer side 58 is in the form of an enlarged, external rounded bearing portion extending the entire length of the wedging element, and accordingly each element is generally rectangular in cross-section save for the enlarged external portion along the side 58. Similarly, the wedging sections 56 and 57 include wedging surface portions 60 and 61 formed at complementary angles to one another so that in assembled relation the wedging elements 54 and 55 will together define one continuous length dimensioned for insertion within the space 28′ formed between the sidewall portions 24′ and 25′. Moreover, it will be seen that the external rounded bearing surfaces conform to the peripheral outline of the shell and with the undersurfaces of the enlarged portions partially overlapping the sidewalls 24′ and 25′. Again, the wedging elements when positioned in end-to-end relation will occupy substantially the entire space within the shell with the enlarged bearing portions of the wedging elements facing in diametrically opposed relation from the space 28′. A retainer band 48′ is utilized to align the wedges for insertion in a hole and once inserted, the band again will be ruptured or expanded as the wedge elements are forced outwardly by inward tightening of the bolt member. In the same manner as described with reference to FIGURES 1 to 4 the wedging sections are expanded into firm wedging engagement with diametrically opposed areas of the wall but in longitudinally offset relation to one another.

In the forms of invention herein set forth and described, the outer shell and wedging elements are preferably composed of metal and may be suitably formed by a forging or casting operation. Because of their solid, rugged construction as well as their size, the wedging elements are ideally suited for use in hard materials, such as rock or concrete. Also because of their width, the wedging elements are readily conformable for use in larger sized holes and, once expanded, are more directly and positively held in place without danger of breaking or loosening under severe loads or vibrations. The advantage afforded in the modified form is that the surface areas of engagement between the side bearing portions and the wall are materially increased.

Accordingly, while preferred and alternate forms of the present invention have been set forth and described herein, it will be apparent that various modifications and changes may be made in the particular construction and arrangement of parts without departing from the spirit and scope of the present invention as defined by the appended claims.

What is claimed is:

1. An anchor bolt comprising in combination a bolt member having an inner threaded end portion, an anchor member including an outer, hollow support defined by axially spaced end portions and spaced sidewall portions of limited circumferential extent interconnecting said end portions to form an open space between said end and sidewall portions, and a pair of wedge members disposed in end-to-end relation between said end portions within the space and terminating in complementary inclined wedging surface portions disposed in abutting relation to one another, said bolt member threadedly engaging a bore in one of the end portions of said support and passing therethrough into engagement with one of said wedge members, said wedging surface portions being slidable in opposite directions in response to inward axial advancement of said bolt member through the end of said support and against said one of said wedge members to undergo outward radial movement in opposite directions from the space.

2. An anchor bolt according to claim 1, said hollow support being defined by an elongated cylindrical shell having opposed circular end portions and a pair of diametrically opposed sidewall portions interconnecting said end portions in spaced parallel relation to one another.

3. An anchor bolt according to claim 1, said wedge members being in the form of oblong blocks loosely disposed in end-to-end relation within the space formed between said end portions, each of said wedge members having a longer side and a shorter side, and an enlarged bearing surface portion being disposed along the longer side of each wedge member.

4. In an anchor bolt adapted for insertion in a blind hole, an anchoring device at the inner end of said anchor bolt comprising a hollow, cylindrical support defined by axially spaced circular end portions and outer wall portions interconnecting said circular end portions in spaced parallel relation to form an elongated open transverse space between said end portions, and a pair of wedging members being loosely disposed in end-to-end relation within the space, said wedging members being in the form of elongated, solid blocks terminating in relatively near, complementary inclined end surface portions arranged in abutting relation to one another, and said end surface portions being slidable outwardly in opposite radial directions from the space into wedging engagement with the surrounding wall of the hole.

5. A rock bolt being adapted for insertion in a blind hole comprising in combination a bolt member having an inner threaded end portion, an anchor member including a hollow cylindrical support having opposite circular end portions and diametrically opposed sidewall portions of limited circumferential extent interconnecting said end portions to form an open transverse space therebetween, and a pair of complementary wedge members being disposed in end-to-end relation within the space, each of said wedge members being defined by an oblong block, each being of a width corresponding to the diameter of said support, and said block terminating in complementary inclined wedging surface portions disposed in abutting relation to one another, the inner threaded end of said bolt member threadedly engaging a bore in one of the end portions of said support and passing therethrough into engagement with the end of one of said blocks opposite to the wedging surface portions, said wedging surface portion being slidable in response to inward axial advancement of said bolt member through the end of said support and against the end of said wedge member to cause outward radial expansion of said blocks in opposite directions from the space into wedging engagement with the wall of the hole.

6. A rock bolt according to claim 5, the end of said one of said wedge members opposite to the wedging surface portion including a depression on its end surface aligned with the bore in said end portion on said support to receive the inner threaded end of said bolt member.

7. A rock bolt according to claim 5, each of said blocks having a longer side and a shorter side, and an enlarged bearing portion extending along the longer side of each block in overlapping relation to said sidewalls.

8. A rock bolt according to claim 5, said sidewalls having external rounded surfaces formed on a radius conforming to the radius of said circular end portions and inner flat surfaces disposed in spaced parallel relation to one another, external ridges on the external surfaces of said sidewalls, and temporary retaining means arranged in surrounding relation to said support to retain said wedge members in end-to-end relation for insertion in the hole without interfering with outward expansion of said wedge members into wedging engagement within the hole.

References Cited

UNITED STATES PATENTS 3,107,569   10/1963   Lerick _____ 85—79

FOREIGN PATENTS 711,324   6/1954   Great Britain.

EDWARD C. ALLEN, *Primary Examiner.*